(12) United States Patent
Engström et al.

(10) Patent No.: US 8,995,508 B2
(45) Date of Patent: *Mar. 31, 2015

(54) METHOD AND ARRANGEMENT IN A DIGITAL SUBSCRIBER LINE SYSTEM

(71) Applicant: Ericsson AB, Stockholm (SE)

(72) Inventors: Bo Engström, Luleå (SE); Frank Sjöberg, Luleå (SE); Hans Öhman, Luleå (SE)

(73) Assignee: Ericsson AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/721,494

(22) Filed: Dec. 20, 2012

(65) Prior Publication Data

US 2013/0177052 A1   Jul. 11, 2013

Related U.S. Application Data

(63) Continuation of application No. 12/376,292, filed as application No. PCT/EP2007/055869 on Jun. 14, 2007, now Pat. No. 8,369,391.

(60) Provisional application No. 60/841,229, filed on Aug. 31, 2006.

(30) Foreign Application Priority Data

Aug. 31, 2006   (EP) ..................................... 06119885

(51) Int. Cl.
*H04L 5/16* (2006.01)
*H04L 5/06* (2006.01)
*H04M 11/06* (2006.01)
*H04B 3/32* (2006.01)

(52) U.S. Cl.
CPC ............... *H04M 11/062* (2013.01); *H04L 5/06* (2013.01); *H04B 3/32* (2013.01)
USPC ........................... 375/222; 375/257; 375/260

(58) Field of Classification Search
USPC .......................... 375/222, 257–258, 260, 285
See application file for complete search history.

(56) References Cited

U.S. PATENT DOCUMENTS

2011/0110409 A1 *   5/2011   Sands et al. ................... 375/222

FOREIGN PATENT DOCUMENTS

WO   WO 2004091249 A1 *  10/2004
WO   WO 2005114861 A1 *  12/2005

* cited by examiner

*Primary Examiner* — Sam K Ahn
*Assistant Examiner* — Janice Tieu

(57) ABSTRACT

Transmitting and receiving arrangements and methods in a Digital Subscriber Line (DSL) system having a plurality of modems and vectored transmission capability. A first part of an available frequency band is reserved exclusively for vectored DSL transmission and reception using modems operating in the first part of the frequency band. The remaining, second, part of the available frequency band is reserved for both vectored and non-vectored transmission using modems operating in the second part of the frequency band.

12 Claims, 6 Drawing Sheets

METHOD AND ARRANGEMENT IN A DIGITAL SUBSCRIBER LINE SYSTEM

CROSS-REFERENCE TO RELATED APPLICATIONS

This application is a continuation of U.S. patent application Ser. No. 12/376,292 filed Feb. 4, 2009, now U.S. Pat. No. 8,369,391, which is a 371 of International Application No. PCT/EP2007/055869, filed Jun. 14, 2007, the disclosures of which are fully incorporated herein by reference.

FIELD OF THE INVENTION

The present invention relates to a digital subscriber line (DSL) system. In particular, the present invention relates to a vectored DSL system which implies that lines from a plurality of independent modems are co-ordinated before transmission in order to reduce cross-talk.

BACKGROUND

FIG. 1 shows a telephone network constituting a star-net-topology. A fibre backbone is terminated at a Central Office (CO) supporting 500-20000 end customers. From the CO primary cables carrying 100-1200 twisted pairs runs to Cabinets (Cab) which are cross-connect-points that normally have no power and environmental capabilities. The last 100-800 meters of twisted pairs between the Cab and the customer premises is called the distribution network.

It is desirable to re-use the existing copper network for delivering high capacity data connections, i.e. broadband access, to the customer premises. The family of systems designed for this purpose is called Digital Subscriber Lines (DSL) systems. Example DSL technologies (sometimes called xDSL) include High Data Rate Digital Subscriber Line (HDSL), Asymmetric Digital Subscriber Line (ADSL), a version of DSL with high download speed than upload speed, Very-high-bit-rate Digital Subscriber Line (VDSL).

The most recently standardized broadband technology for the copper networks is VDSL. It provides higher data bandwidths than precursors like ADSL and HDSL, but to the expense of shorter reach. Currently, the latest version of the VDSL-standard is called VDSL2.

For VDSL, network operators can only partly use the same deployment strategy as for ADSL, which is to install the DSL-modems in the central office. From the central office, VDSL can be offered to 30-50% of customers compared to 80-90% in the case of ADSL, dependent on the topology of the specific network. To further increase the VDSL customer base, it can be deployed from a fibre-to-the-cabinet (FTTCab) infrastructure meaning that the fibre termination point is moved closer to the premises giving a shorter copper loop. The cabinet is deployed at the local cross-connect point for the distribution network, which normally is the only point-of-presence for the cable. The VDSL digital subscriber line access multiplexer (DSLAM) equipment, where all DSL-modems are connected to the backbone network, will be placed in the new cabinet and VDSL is used to serve the customers over the last drops of cable.

Statistics of cable lengths and the network topology are crucial parameters when deploying DSL. The copper loops have the property that the possible data capacity that can be transferred decreases for longer loops. A second property that limits the possible data rates is crosstalk, i.e., self made noise that occurs between different loops in the same cable during transmission. This effect is more pronounced on shorter loops, since one important kind of crosstalk tends to decrease with increasing loop length.

Common to all existing DSL systems is that they are designed for a worst case scenario. This means that the systems are designed for a maximum cross-talk scenario, i.e., that all systems are transmitting all the time and that they generate full cross talk to each other.

There are two kinds of crosstalk: Near End Cross Talk (NEXT) and Far End Cross Talk (FEXT). The NEXT is noise that comes from a transmitter on a neighbouring pair at the same end of the line and the FEXT is noise that comes from a transmitter on a neighbouring pair located at the far end of the line.

The NEXT is always stronger than the FEXT and most DSL systems are designed to avoid the NEXT but assumes that there are always FEXT present. Some systems operating at low frequencies (e.g. less than 500 kHz) are designed to take into account also NEXT. This is possible since NEXT is not very severe at low frequencies, which is illustrated in FIG. 3.

By coordinating the signal transmission and reception for a plurality of modems in the CO, the FEXT can be eliminated. This is often referred to as vectored transmission, vectoring, or vectored DSL. For shorter loops the FEXT is the dominating noise source of essentially the entire frequency band. Thus, the elimination of FEXT, with vectored DSL, can substantially increase the achievable bitrates, especially for modem on shorter loops. Deployment of VDSL from the FTTCab as discussed above will lead to much shorter loops and also fewer loops in each cable. With vectored VDSL the bitrates for shorter loops (<800 m) can be increased with 50% to 200% depending on loop length. Shorter loops have normally higher levels of FEXT than longer loops, and can therefore gain more when removing the FEXT with vectoring techniques.

Coordinated signal transmission and reception of all modems, referred to as vectored DSL, is possible, since the modems are co-located in a CO or cabinet. In the upstream direction (signal reception) this is called FEAT cancellation or multi-user detection. In the downstream direction (signal transmission) it is called FEXT pre-coding, but sometimes it is also called FEXT cancellation in the downstream direction.

There exist numerous techniques for vectored transmission (i.e. the use of FEXT pre-coding and multi-user detection). However, since the FEAT vector channel has property called row-wise diagonal dominance, it has been proved that diagonalizing pre-coding for the downstream and zero forcing equalization for the upstream yields close to optimal performance which is further described in R. Cendrillon, M. Moonen, E. Van den Bogaert, G. Ginis, "The Linear Zero-Forcing Crosstalk Canceller is Near-optimal in DSL Channels", in Proc. of IEEE Global Comm. Conf. (GLOBECOMM), Dallas, Tex, pp 2334-2338 , November 2004.

The drawback with all vectoring techniques is that they lead to highly complex and large chipsets and systems. The complexity of the vectoring processing grows with the square of the number of modems the vectored DSL system can handle.

To guarantee best possible bit-rate performance all modems in a cable must be part of the same vectored DSL system. If some non-vectored DSL-modems are operating on loops in the same cable as the vectored DSL-modems they will generate FEXT, which can reduce the bit rates significantly for sonic or all of the vectored DSL-modems.

Since it can be practically impossible to build a vectored DSL system that can handle a large number of DSL-modems suboptimal solutions must be used. A simple solution is to not allow more DSL-modems to communicate in a cable than what the vectored DSL-system can handle.

Other solutions are based on the fact that most often, any single DSL-modem receive strong FEXT from only a few other loops (i.e. DSL-modems). But, which loops that generates strong crosstalk depends both on frequency and which loop that is considered. An electronically controlled cross-connecting device can be used to select a subset of loops which receive as little crosstalk as possible from other loops.

Thus, a problem with the existing solutions is either that the number of DSL modems is limited to the capacity of the DSL vector system (i.e. the pre-coder and the detector), or if the number of DSL modems is not limited by the capacity of the DSL vector system, some of the DSL modems will not be affected by the DSL vector system (denoted non-vectored DSL modems) which results in that they will introduce crosstalk and some of the DSL-modems that are operated by the DSL vector system cannot benefit from the vectoring since they will receive crosstalk from the non-vectored DSL modems.

Another problem with the latter case of having a mixture of non-vectored DSL-modems and vectored DSL modems is that unless all FEXT-couplings between all wires in the cable is more or less exactly known, it will be very difficult to predict what bitrates a certain customer using a certain modem can achieve and consequently what services an operator can offer to that customer.

SUMMARY

The object of the present invention is to achieve an improved vectored DSL system, in situations where it is impossible, or too expensive, to vectorize all modems, e.g., when the number of loops and active DSL-modems in a cable is very large.

The object is achieved by methods and arrangements wherein a first part of an available frequency band is reserved exclusively for vectored DSL transmission and reception.

The remaining part of the available frequency band can then be used either for only standard non-vectored transmission or for both for vectored DSL and for standard non-vectored DSL transmission. Therefore, the present invention makes it possible to get the full benefit of vectored transmission, on at least the first part of the frequency band, even if the DSL vector system cannot handle all DSL modems.

According to an embodiment of the invention, the first part of the frequency band reserved for vectored DSL can be further subdivided into several disjoint sub-parts.

According to a further embodiment, the first part comprises a higher frequency set than the second part.

The object is achieved by the arrangements and methods according to the independent claims.

Preferred embodiments are defined by the dependent claims.

An advantage with the present invention is that almost the full benefit of significantly increased bitrates that vectored DSL give, can be achieved, even if not all modems are part of the vectorized DSL systems.

A further advantage with the present invention is that standard non-vectored VDSL2-modems are only affected a little by the reservation of the first part of the frequency band used for vectored DSL.

A yet further and very important advantage is that it is relatively easy to predict the bitrates a user can achieve, and what services that the user can be offered by a service provider.

DETAILED DESCRIPTION

In the following description, for purposes of explanation and not limitation, specific details are not forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The basic idea of the present invention is to reserve a first part of an available frequency band exclusively for vectored DSL transmission and reception. The remaining part of the available frequency band can then be used either for only standard non-vectored transmission or for both for vectored DSL and for standard non-vectored DSL transmission. Therefore, the present invention makes it possible to get the full benefit of vectored transmission, on at least the first part of the frequency band, even if the DSL vector system cannot handle all DSL modems. It should be noted that the above mentioned first and second parts of the available frequency band may comprise continuous frequency band as well as discontinuous frequencies, e.g., the first part may comprise every subcarrier with odd number in a multicarrier system such as VDSL.

Figure 5:
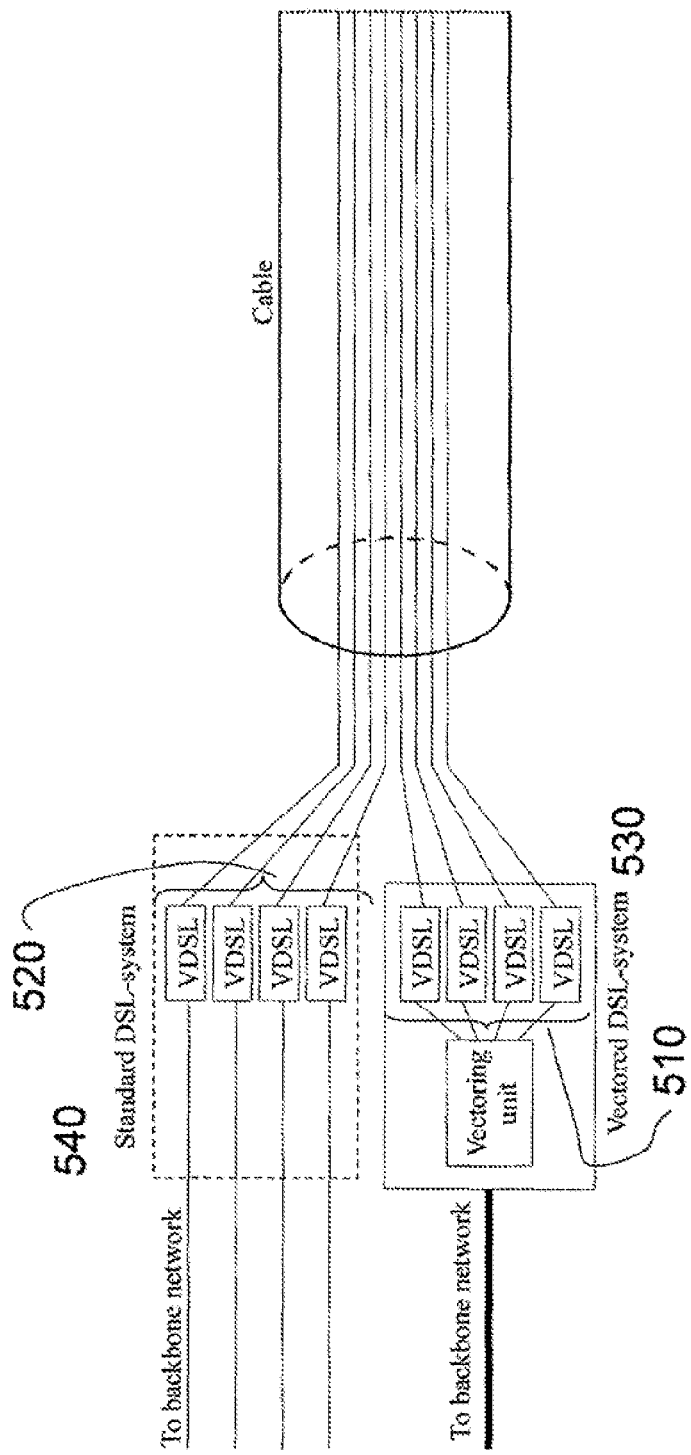
FIG. 5 illustrates transmitting and receiving arrangements according to the present invention.

FIG. 5 is illustrating how the vectorized DSL-modems 510, and the standard DSL-modems 520 are connected to the loops in the cable at the CO or in a cabinet.

The present invention relates to a transmitting arrangement and to a receiving arrangement in a DSL system and to methods thereof. In the transmitting arrangement the DSL vector system may be a precoder and in the receiving arrangement the DSL vector system may be a detector. The transmitting arrangement according to the present invention comprises at least one vectored DSL system arranged for transmitting data associated with a plurality of modems in a co-ordinated manner, wherein an available frequency band is divided into a first part and into a second part disjoint form said first part. The first part is reserved for vectored transmission, such that at least one vectored DSL system is adapted to at least operate on loops associated with modems transmitting on frequencies comprised in the first part of the available frequency band.

The receiving arrangement according to the present invention comprises at least one vectored DSL system arranged for receiving data associated with a plurality of modems in a co-ordinated manner, wherein an available frequency band is divided into a first part and into a second part disjoint form said first part. The first part is reserved for vectored reception, such that at least one vectored DSL system is adapted to at least operate on loops associated with modems transmitting on frequencies comprised in the first part of the available frequency band.

According to an embodiment, the second part of the available frequency band is adapted to be used for both vectoring and non-vectoring transmission/reception such that the at least one vectored DSL system is adapted to at least operate on loops associated with modems transmitting/receiving on frequencies comprised in the first part and the second part of the available frequency band and such that said arrangement comprises means for transmitting/receiving data associated with modems transmitting/receiving on frequencies within the second part without operation of any vectored DSL system.

Figure 1:
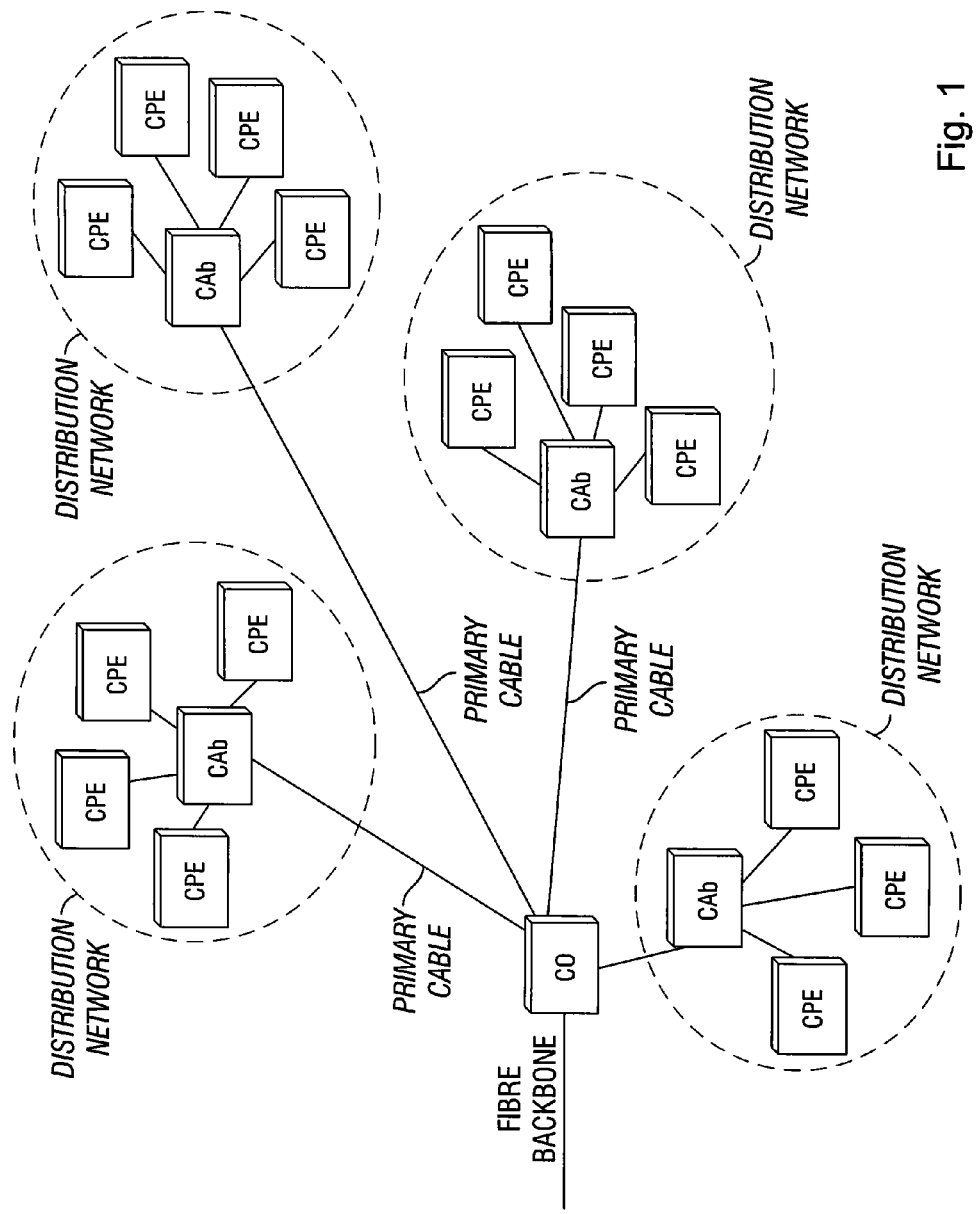
FIG. 1 illustrates a telecommunication access network wherein the present invention may be implemented.
Figure 2:
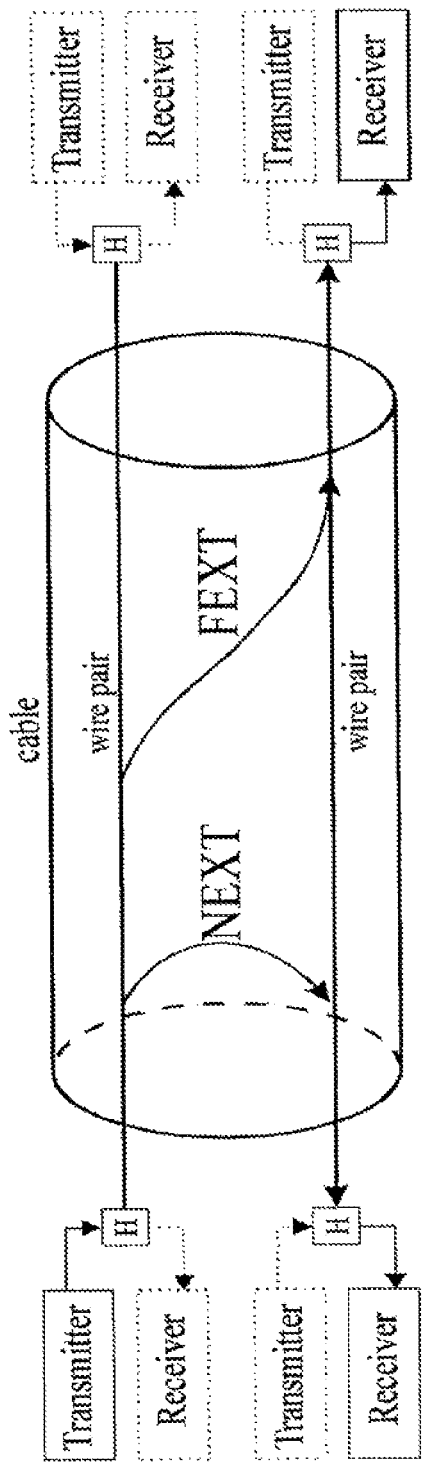
FIG. 2 illustrates schematically generated cross-talk referred to as the NEXT and the FEXT.
Figure 3:
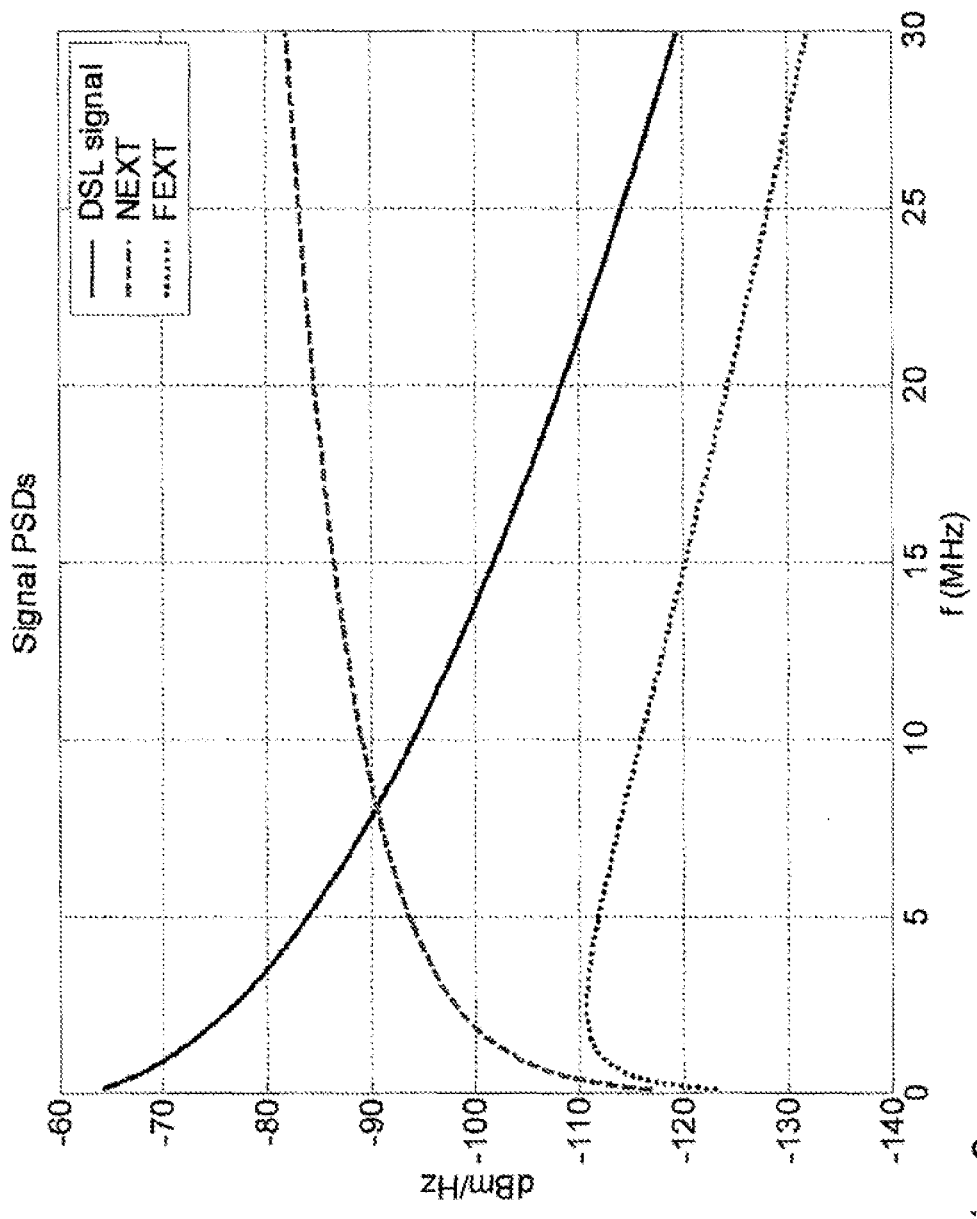
FIG. 3 is a graph illustrating an example of power spectral densities of signal attenuation, NEXT and FEXT.
Figure 4:
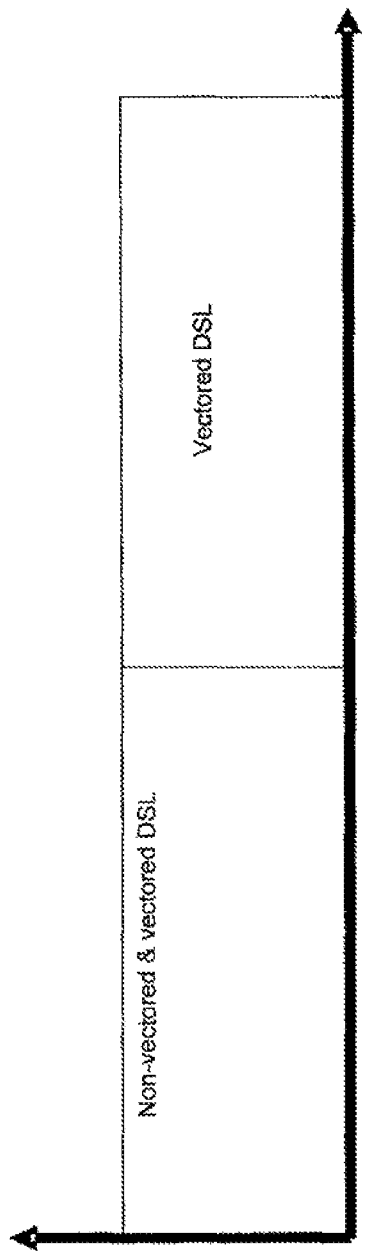
FIG. 4 illustrates schematically a mixed duplex frequency plan according to the present invention.

Turning now to FIG. 4, illustrating the above described, embodiment of the present invention, showing how the available frequency band is split into a first part to be used for vectored DSL and into a second part to be used for both vectored and non-vectored DSL. Each frequency band can then be divided between the two transmission directions using the preferred duplex method (Zipper/FDD/Echo cancellation/Burst mode) as disclosed in WO 2004/091249.

According to a preferred embodiment, the first part of the frequency band reserved for vectored DSL comprises higher frequencies than the frequency band used for non-vectored DSL and vectored DSL. This is because modems on shorter loops have more to gain from vectored transmission and should be prioritized when selecting which loops that shall be connected to vectored DSL-modems. Modems on longer loops which have less to gain from vectoring can anyhow not use higher frequencies because of the channel attenuation.

The first part of the frequency band reserved for vectored DST, can be further subdivided into several disjoint sub-parts. Each sub-part is then used by a different vectored DSL system, whereby each vectored DST, system is using vectored transmission and reception only in the reserved sub-part.

Figure 6:
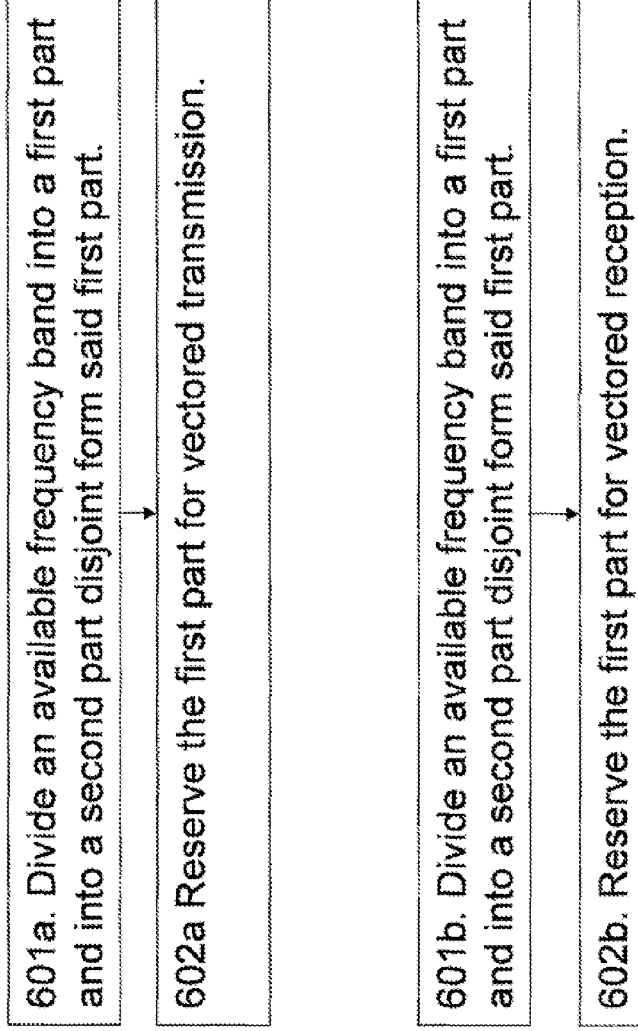
FIG. 6 is a flowchart of the methods according to the present invention.

Moreover, the present invention also relates to a method for transmission and a method for reception which is illustrated by the flowchart of FIG. 6. The method for transmission comprises the steps of:

601a. Divide an available frequency band into a first part and into a second part disjoint form said first part.

602a. Reserve the first part for vectored transmission, such that at least one vectored DSL system is operating on loops associated with modems transmitting on frequencies comprised in the first part of the available frequency band.

Hence, the method for receiving comprises the steps of:

601b. Divide an available frequency band into a first part and into a second part disjoint form said first part.

602b. Reserve the first part for vectored reception, such that at least one vectored DSL system is operating on loops associated with modems receiving on frequencies comprised in the first of the available frequency band.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A transmitting arrangement for a digital subscribe line (DSL) system, the transmitting arrangement comprising:
   a plurality of modems; and
   a vectored DSL system configured to transmit data associated with the plurality of modems in a co-ordinated manner;
   wherein the arrangement is configured to divide an available frequency band into a first part and into a second part disjoint from the first part;
   wherein the arrangement is configured to reserve the first part of the available frequency band for vectored transmission; and
   wherein the arrangement is configured to reserve the second part of the available frequency band for both vectored and non-vectored transmissions.

2. The transmitting arrangement according to claim 1, wherein the data is transmitted by a plurality of vectored DSL systems, and the arrangement is configured to divide the first part of the available frequency band into at least two disjoint sub-parts of frequencies within the first part, wherein each sub-part is reserved for one of the plurality of vectored DSL systems.

3. The transmitting arrangement according to claim 1, wherein the first part of the available frequency band comprises a higher frequency set than the second part.

4. A receiving arrangement for a digital subscriber line (DSL) system, the receiving arrangement comprising:
   a plurality of modems; and
   a vectored DSL system configured to receive data associated with the plurality of modems in a co-ordinated manner;
   wherein the arrangement is configured to divide an available frequency band into a first part and into a second part disjoint from the first part;
   wherein the arrangement is configured to reserve the first part of the available frequency band for vectored reception; and
   wherein the arrangement is configured to reserve the second part of the available frequency band for vector and non-vectored reception.

5. The receiving arrangement according to claim 4, wherein the data is received by a plurality of vectored DSL systems, and the first part of the available frequency band comprises at least two disjoint sub-parts of frequencies within the first part, wherein each sub-part is reserved for one of the plurality of vectored DSL systems.

6. The receiving arrangement according to claim 4, wherein the first part of the available frequency band comprises a higher frequency set than the second part.

7. A method for transmission in a digital subscriber line (DSL) system, the transmission method comprising the steps of:
   transmitting data associated with a plurality of modems in a coordinated manner by a vectored DSL system, wherein the transmitting step includes:
      dividing an available frequency band into a first part and into a second part disjoint from said first part;
      reserving the second part of the available frequency band for vectored transmission; and
      reserving the second part of the available frequency band for both vectored and non-vectored transmissions.

8. The transmission method according to claim 7, wherein the data is transmitted by a plurality of vectored DSL systems, and the first part of the available frequency band comprises at least two disjoint sub-parts of frequencies within the first part, wherein each sub-part is reserved for one of the plurality of vectored DSL systems.

9. The transmission method according to claim 7, wherein the first part of the available frequency band comprises a higher frequency set than the second part.

10. A method for receiving in a digital subscriber line (DSL) system, the receiving method comprising the steps of:
   receiving data associated with a plurality of modems in a coordinated manner by a vectored DSL system, wherein the receiving step includes:
      dividing an available frequency band into a first part and into a second part disjoint from said first part;
      reserving the first part of the available frequency band for vectored reception; and
      reserving the second part of the available frequency band for both vectored and non-vectored reception.

11. The receiving method according to claim 10, wherein the data is received by a plurality of vectored DSL systems, and the first part of the available frequency band comprises at least two disjoint sub-parts of frequencies within the first part, wherein each sub-part is reserved for one of the plurality of vectored DSL systems.

12. The receiving method according to claim 10, wherein the first part of the available frequency band comprises a higher frequency set than the second part.

\* \* \* \* \*

UNITED STATES PATENT AND TRADEMARK OFFICE
CERTIFICATE OF CORRECTION

PATENT NO. : 8,995,508 B2  
APPLICATION NO. : 13/721494  
DATED : March 31, 2015  
INVENTOR(S) : Engström et al.

Page 1 of 2

It is certified that error appears in the above-identified patent and that said Letters Patent is hereby corrected as shown below:

Title page, item (57), under "ABSTRACT", in Column 2, Line 4, delete "reserved exclusively" and insert -- reserved --, therefor.

In the Drawings

In Fig. 6, Sheet 6 of 6, in Step "601a.", in Line 2, delete "form" and insert -- from --, therefor.

In Fig. 6, Sheet 6 of 6, in Step "601b.", in Line 2, delete "form" and insert -- from --, therefor.

In the Specification

In Column 2, Line 40, delete "FEAT" and insert -- FEXT --, therefor.

In Column 2, Line 46, delete "FEAT" and insert -- FEXT --, therefor.

In Column 2, Line 65, delete "sonic" and insert -- some --, therefor.

In Column 2, Line 67, delete "DSL-modems" and insert -- DSL-modems, --, therefor.

In Column 4, Line 20, delete "are not" and insert -- are set --, therefor.

In Column 4, Line 65, delete "form" and insert -- from --, therefor.

In Column 5, Line 7, delete "form" and insert -- from --, therefor.

In Column 5, Line 24, delete "described," and insert -- described --, therefor.

Signed and Sealed this  
Eleventh Day of August, 2015

Michelle K. Lee  
*Director of the United States Patent and Trademark Office*

CERTIFICATE OF CORRECTION (continued)
U.S. Pat. No. 8,995,508 B2

In Column 5, Line 42, delete "DST," and insert -- DSL --, therefor.

In Column 5, Line 44, delete "DST," and insert -- DSL --, therefor.

In Column 5, Line 51, delete "form" and insert -- from --, therefor.

In Column 5, Line 58, delete "form" and insert -- from --, therefor.

In Column 5, Line 62, delete "first" and insert -- first part --, therefor.

In the Claims

In Column 6, Line 6, in Claim 1, delete "subscribe" and insert -- subscriber --, therefor.

In Column 6, Line 33, in Claim 4, delete "moderns;" and insert -- modems; --, therefor.

In Column 6, Line 44, in Claim 4, delete "vector and" and insert -- both vectored and --, therefor.

In Column 6, Line 63, in Claim 7, delete "second" and insert -- first --, therefor.